March 8, 1927.
E. E. DAVIS
EXPANSION REAMER
Filed Oct. 27, 1922
1,619,855
Fig. 1.
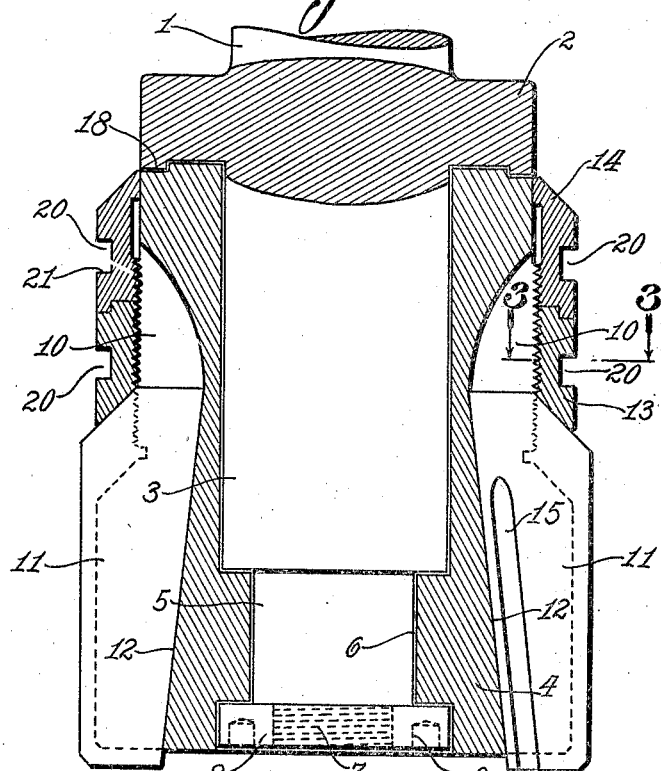
Fig. 2.
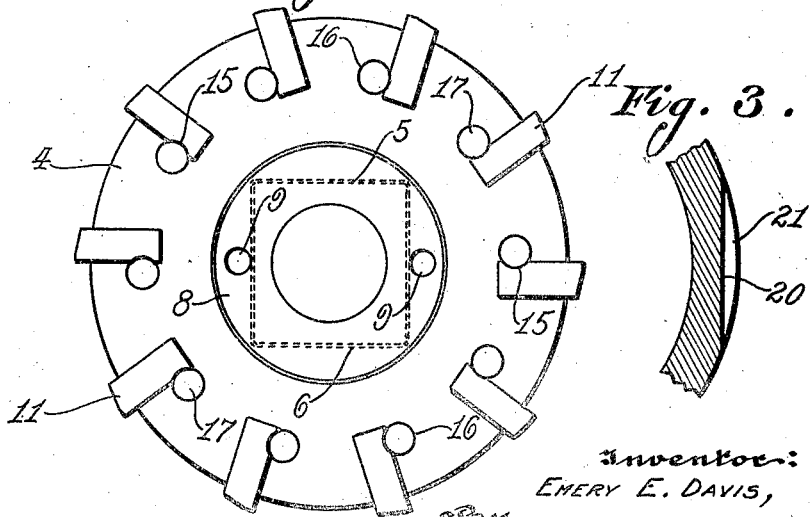
Fig. 3.
Inventor:
EMERY E. DAVIS, Patented Mar. 8, 1927.

1,619,855

UNITED STATES PATENT OFFICE.

EMERY E. DAVIS, OF ST. LOUIS, MISSOURI, ASSIGNOR TO DAVIS BORING TOOL COMPANY, OF ST. LOUIS, MISSOURI, A CORPORATION OF MISSOURI.

EXPANSION REAMER.

Application filed October 27, 1922. Serial No. 597,302.

This invention relates to reamers.

In most reaming operations, the object of the operation is to slightly enlarge and finish a hole that has already been drilled or bored. The original boring operation usually establishes the location of the center of the hole and the subsequent reaming operation should not disturb that location. As the reamer is usually mounted rigidly in a support, it is necessary to aline the reamer very accurately so that it shall cut a uniform amount from all sides of the hole and leave the centering undisturbed. If the reamer is not accurately alined, it will cut a greater amount from one side than from the other and thus the position of the center of the hole will be displaced.

One of the objects of this invention, therefore, is to provide a reamer which will have a certain amount of play so that it may adjust itself to the alinement of the hole to be reamed.

Another object of this invention is to provide a reamer with a floating head which will adjust itself to the position of the hole.

Further objects will appear from the detail description taken in connection with the accompanying drawing, in which:

Figure 1 represents a sectional view of an expansion type reamer embodying this invention;

Figure 2 is an end view of Figure 1; and

Figure 3 is a detail section on line 3—3, Figure 1.

Referring to the accompanying drawing, 1 designates the shank of a reamer by means of which it is mounted in the machine or holder in which it is to be used. The shank is provided with a flange 2 and a cylindrical extension 3. The extension 3 is adapted to extend into the head 4 of the reamer. Clearance is allowed between the extension 3 and the bore of the head into which it fits so as to permit a certain limited amount of play between the two. A few thousandths of an inch is ordinarily enough. The extension 3 thus forms a bearing extending loosely into the head and serving to guide and support the same, while at the same time, allowing a certain amount of free movement radially and axially. Near the extremity of the extension 3 a portion 5 thereof is formed with an angular outline, a square outline being shown, which fits loosely into a corresponding socket 6 in the head 4. This connection allows sufficient clearance so as not to restrict the free movement above mentioned.

The end of the shank may be reduced and provided with a thread 7 adapted to engage a nut 8 or other suitable fastening device so as to maintain the head in place on the shank. The nut 8 is shown provided with depressions 9 which may be engaged by a suitable wrench for screwing up the nut. The angular part 5 and its socket 6, therefore, provide a loose coupling or driving connection by means of which the head 4 may be driven during the cutting operation.

The head 4 may be provided with a series of slots 10 adapted to form seats for a series of blades or cutters 11. The bottoms 12 of the slots 10 may be arranged to incline outwardly toward the tip of the head and the bottom edges of the blades 11 may be correspondingly tapered so that upon movement of the blades 11, along the slots and toward the tip, said blades will be expansible. An adjusting ring 13 screw threaded on the head may be arranged to engage the rear faces of the blades 11 so as to adjust the position of the same along the slots 10. Such adjustment will also adjust the external diameter of the cutters. A backing ring 14 may be arranged to engage the rear of the ring 13 to secure the same in adjustment. The cutters may be provided with grooves 15 matching with grooves 16 in the head 4 into which pins 17 may be driven so as to secure the blades 11 in their seats.

The flange 2 may be provided with a shoulder 18 adapted to match a corresponding shoulder on the head 4 forming a rib and channel connection so as to provide a dust shield to prevent dust and dirt entering between the shank extension 3 and the head 4. The flange 2, moreover, provides a backing for the head to protect the rear thereof and to assist in taking the thrust.

In order to permit adjustment of the rings 13 and 14, these are not provided with the usual sockets, but they are recessed as shown at 20 in order to provide bottom faces on opposite sides of the rings which are parallel in order to receive a wrench. These faces do not, however, extend the entire width of a ring, but walls 21 are left on both sides of a recess so that the strength of the ring will be maintained.

It will be noted that this invention provides a simple and useful tool for reaming and one which will aline itself in the hole. The loose fit between the bearing 3 and the head 4 provides for free movement of the head radially and axially so that during the cutting operation, the head floats on the shank and by means of the loose driving connection provided by the angular member 5, the cutters are driven for reaming. The diameter of the cutters is adjustable and the entire device is so constructed that parts are easily renewable when worn.

It is obvious that various changes may be made in details without departing from the spirit of this invention; it is, therefore, to be understood that this invention is not to be limited to the specific details shown and described.

Having thus described the invention, what is claimed is:

1. A reamer comprising, a shank, a head loosely mounted on said shank and provided with cutting edges, a loose angular driving connection between said head and said shank at the tip of said head, and an overhanging shoulder on one part loosely entering a recess in the other part at the back of said head adapted to provide a dust seal.

2. A reamer comprising, a shank, a head loosely mounted on said shank and provided with cutting edges, a reduced angular part on said shank loosely engaging a corresponding opening at the tip of said head, and an overhanging shoulder on one part loosely entering a recess in the other part at the back of said head adapted to provide a dust seal.

3. A reamer comprising, a shank, a head loosely mounted on said shank and provided with cutting edges, a reduced angular part on said shank loosely engaging a corresponding opening at the tip of said head, a nut on the end of said shank loosely entering a recess on said head, and an overhanging shoulder on one part loosely entering a recess in the other part at the back of said head adapted to provide a dust seal.

4. A reamer comprising, a shouldered shank, a head loosely mounted on said shank and provided with cutting edges, an angular driving connection between said head and the tip of said shank, a groove in the shouldered part of said shank, and a projection on the rearward part of said head adapted to engage said groove to provide a dust seal, said projection also serving to back up said head.

5. A reamer comprising, a shank, a head loosely mounted thereon and provided with cutting edges, an angular driving connection between said shank and the tip of said head, and a flange on said shank adapted to provide a backing, and having a rib and channel connection with said head.

In testimony whereof I affix my signature this 1st day of Sept., 1922.

EMERY E. DAVIS.